US012700822B2

(12) United States Patent
Kim et al.

(10) Patent No.: US 12,700,822 B2
(45) Date of Patent: Aug. 4, 2026

(54) CONSTRUCTION METHOD AND SYSTEM OF A SOLAR CELL POWER PLANT

(71) Applicants: Jong Hae Kim, Gimpo-si (KR);
Michael J. Kim, Reseda, CA (US);
Tommy Y. Kim, Verdes Palos Rancho,
CA (US)

(72) Inventors: Jong Hae Kim, Gimpo-si (KR);
Michael J. Kim, Reseda, CA (US);
Tommy Y. Kim, Verdes Palos Rancho,
CA (US)

( * ) Notice: Subject to any disclaimer, the term of this
patent is extended or adjusted under 35
U.S.C. 154(b) by 0 days.

(21) Appl. No.: 18/633,160

(22) Filed: Apr. 11, 2024

(65) Prior Publication Data

US 2024/0258960 A1 Aug. 1, 2024

Related U.S. Application Data

(63) Continuation-in-part of application No. 18/134,939,
filed on Apr. 14, 2023, now abandoned, which is a
(Continued)

(30) Foreign Application Priority Data

Oct. 14, 2020 (KR) ........................ 10-2020-0132555

(51) Int. Cl.
*H02S 20/30* (2014.01)
*H02S 10/12* (2014.01)
(Continued)

(52) U.S. Cl.
CPC .............. *H02S 20/30* (2014.12); *H02S 10/12*
(2014.12); *H02S 20/10* (2014.12); *H02S 30/10*
(2014.12); *H02S 40/10* (2014.12); *H02S 40/22*
(2014.12)

(58) Field of Classification Search
None
See application file for complete search history.

(56) References Cited

U.S. PATENT DOCUMENTS

2010/0051083 A1* 3/2010 Boyk ...................... H02S 20/32
52/636
2012/0016815 A1 1/2012 DeBartolo, III et al.
(Continued)

FOREIGN PATENT DOCUMENTS

CA 2695754 A1 * 9/2011 ............. A01F 25/13
KR 101498566 B1 3/2015
(Continued)

OTHER PUBLICATIONS

English language machine translation of KR-20220072368-A. (Year:
2025).*

(Continued)

*Primary Examiner* — Eli S Mekhlin
(74) *Attorney, Agent, or Firm* — Brooks Kushman P.C.

(57) ABSTRACT

A method for constructing a solar power plant on various
terrains involves installing reinforced concrete piles to form
a lattice on the ground or foreshore, building a lattice-type
truss with steel beams and longitudinal rails, and mounting
solar panels whose inclinations can adjust 360 degrees via
length-variable connectors. This setup allows for easy main-
tenance and replacement of panels using a track vehicle,
enhancing system durability and reducing construction
costs. The design negates extensive land leveling, offering a
cost-effective, typhoon-resistant structure that minimizes the
need for terrain modification, streamlining the installation of
large-scale solar facilities.

19 Claims, 4 Drawing Sheets

Related U.S. Application Data continuation-in-part of application No. PCT/KR2021/007009, filed on Jun. 4, 2021.

(51) Int. Cl.

| | |
|---|---|
| *H02S 20/10* | (2014.01) |
| *H02S 30/10* | (2014.01) |
| *H02S 40/10* | (2014.01) |
| *H02S 40/22* | (2014.01) |

(56) References Cited

U.S. PATENT DOCUMENTS

| | | |
|---|---|---|
| 2017/0163209 A1 | 6/2017 | Bailey et al. |
| 2020/0295213 A1 | 9/2020 | Pan |
| 2021/0351740 A1 | 11/2021 | Nagler et al. |

FOREIGN PATENT DOCUMENTS

| | | |
|---|---|---|
| KR | 101528755 B1 | 6/2015 |
| KR | 20160001338 U | 4/2016 |
| KR | 20190134377 A | 12/2019 |
| KR | 20200087995 A | 7/2020 |
| KR | 102258811 B1 | 5/2021 |
| KR | 102377859 B1 | 3/2022 |
| KR | 102385469 B1 | 4/2022 |
| KR | 20220072368 A * | 6/2022 | ............ H02S 20/30 |
| KR | 102474945 B1 | 12/2022 |
| WO | 2022080620 A1 | 4/2022 |

OTHER PUBLICATIONS

International Search Report and Written Opinion dated Mar. 31, 2025 for PCT/US2024/024541 filed Apr. 14, 2024, 15 pages.

Non-Final Office Action dated Mar. 26, 2024 for U.S. Appl. No. 18/134,939, filed Apr. 14, 2023.

International Search Report dated Sep. 14, 2021 for PCT/KR2021/007009, 7 pages.

* cited by examiner

CONSTRUCTION METHOD AND SYSTEM OF A SOLAR CELL POWER PLANT

CROSS-REFERENCE TO RELATED APPLICATIONS

This application is a continuation-in-part of U.S. application Ser. No. 18/134,939, filed on Apr. 14, 2023, which is a continuation-in-part of PCT International Application No. PCT/KR2021/007009, filed on Jun. 4, 2021, which claims priority to Korean Patent Application No. 10-2020-0132555, filed on Oct. 14, 2020, which are incorporated herein by reference in their entirety.

TECHNICAL FIELD

The present invention concerns a method and system apparatus for constructing a solar cell power plant using mudflat, wasteland or farmland without compromising the use of the land; more specifically, the present invention provides a structure that is safe from typhoons without tilting due to load distribution by fixing and driving concrete piles in a lattice shape at a height of at least 1 m from the water surface of tidal mudflats, wasteland or farmland without transforming the mudflats, wasteland or farmland, and then, on top of the concrete piles, by forming a lattice-type truss structure that connects a transverse steel structure and a plurality of longitudinal rails; improving the solar collection efficiency by adjusting inclination of a solar cell panel to 360 degrees by connecting the rails and the 4 axes of the upper, lower, left and right sides of the solar cell panel with a length-variable connector between the rails of the truss; constructing a rail for driving a track vehicle between the rails mounted on the transverse steel beams of the truss; thereby, the present invention (1) provides a solution to change the inclination of the panel to 360 degrees without modifying the panel mounting structure; (2) provides a safe structure against typhoons by lattice-type truss structure in which a load is distributed by a plurality of concrete piles; (3) improves the lifespan of the solar power plant semi-permanently because it is easy to replace broken panel, install, dismount, or do after-installation maintenance for each panel by the track vehicle; (4) provides the most economical solution to build a large-scale solar cell power plant by reducing the cost for securing land and the cost of civil engineering for creating flatlands unnecessary since the truss is leveled by the height of the pile; and (5) provides an optimal solution to build an eco-friendly hybrid power generation system that substitutes nuclear or thermal power generation by additionally configuring wind power generator that share access paths, transmission routes and ESS.

BACKGROUND

The existing method of installing solar cell panels is to install a panel composed of a plurality of solar cell modules on a cradle on the ground and to adjust the inclination of the panel in advance or remotely control it; such a method is vulnerable to typhoons or strong winds due to the weight and height of the solar cell panel, and a large area of land is required as a separation distance is necessary to avoid shade between the panels.

In Korean Patent Registration No. 10-1108713 (Solar Power Generation Apparatus with Easiness of Adjusting Inclination Angles), an apparatus that connects the cradle and the solar cell panel with a hinge axis and varies the inclination on the hinge axis is configured, but there is a problem whereby the panel is knocked down by strong wind due to the high load of the solar cell panel itself, thereby damaging the panel.

Korean Patent Registration No. 10-1670346 (Solar Power Generation Apparatus for Installing on Standing-Seam Roofs) discloses a configuration in which an upper frame supporting the solar cell panel and a lower frame supporting the frame are prefabricated, and the installation is completed by fixing the panel's inclination; however, this method has a problem that the inclination cannot be arbitrarily adjusted after installation.

Korean Patent Registration No. 10-0887723 (Offshore Fixed Structure for Solar Power Collection Panels) has been registered for a patent for an offshore structure for installing solar power collection panels in rivers or lakes; however, there is a problem that the unit cost of power generation is at least twice that of conventional thermal power generation because the installation cost is still high.

Existing solar power generation systems installed on lakes, rivers, or shores are all floating-type systems, and the cost of building the system is high, and the lifespan is short due to corrosion of the floating devices.

In the case of Korea, for instance, the tidal flat area is 2,482 km$^2$ (Korean government 2019 data), and 1 ha of land is required for 1 MW of solar power generation; hence, if solar power generation facilities are built by using abandoned tidal flats in Korea, 248,200 MW of electricity can be generated. This means it can replace 177 nuclear or thermal power plants with a capacity of 1,400 MW.

In 1954, Bell Laboratories recorded an efficiency of 4% with a silicon (Si) solar cell; yet, by enhancing the purity of the material and improving the manufacturing process technology, now the efficiency of mass-produced cells has been improved to around 15%. Then, it became possible to increase the mass production efficiency by 22% or more and reduce the manufacturing cost of a solar cell to ⅓ or less with the metal oxide called perovskites.

As such, the cost could be reduced as above, and the Grid Parity—where the cost of photovoltaic power generation required to produce 1 KW of electricity equals the cost of producing general electricity produced using fossil fuels— has already been reached; however, it is difficult to secure large-scale land, thigh cost for civil engineering for flat land for constructing large-scale solar power plants.

Even more so, since countries worldwide are declaring carbon-neutral targets by 2050, it is critical to develop technology to build large-scale photovoltaic power generation facilities on top of neglected tidal flats, wastelands, or farmlands to reduce carbon emissions without harming such lands' functions.

In countries worldwide, nuclear fission-type nuclear power generation is vulnerable to earthquakes or tsunamis; also, if a nuclear power plant is destroyed by bombing during wartime, it causes damage on the scale of an atomic bomb, so nuclear power plants are not established at the outset in Israel; countries with a risk of war or terrorism increasingly tend to avoid nuclear power plants.

Moreover, in the case of thermal power generation using coal, various countries are closing down such power generation facilities due to pollution; hence, it is necessary to develop an industrial solar power generation technology that can replace nuclear power or thermal power generation in the future and an eco-friendly power generation system that can dramatically lower the costs of power generation.

SUMMARY OF THE INVENTION

In at least one aspect, a method and system for constructing a solar cell power plant on foreshore wastelands, and farmlands without compromising the use of the land is provided. This innovative approach involves installing reinforced concrete piles at a height of at least 1 meter above ground or water level in a lattice-divided surface of the area designated for solar cell panel installation. A lattice-type truss is then constructed by connecting steel beams in a transverse direction on the piles and adding a series of rails in a longitudinal direction on the beams. Solar cell panels are installed with the capability of adjusting their inclination to 360 degrees by modifying the length of a length-variable connector between the truss rails and the four axes of the solar cell panel. Additionally, a rail is constructed for the operation of a track vehicle between the rails mounted on the transverse steel beams of the truss.

In another aspect, the method and system solve several problems associated with traditional solar power installations, including vulnerability to typhoons or strong winds, the high land use requirement, the inability to adjust panel inclination after installation, and high installation costs, particularly for floating systems. By leveraging neglected lands like tidal flats, wastelands, or farmlands, the invention enables the generation of substantial amounts of electricity without harming the land's functions, offering a durable, cost-effective, and eco-friendly solution for large-scale solar power generation. This system not only provides an optimal solution for constructing eco-friendly hybrid power generation systems as alternatives to nuclear or thermal power generation but also enhances the lifespan of solar power plants by facilitating easy maintenance, replacement, and repair of solar panels using track vehicles.

In some aspects, the techniques described herein relate to a method for constructing a solar cell power plant on foreshores, wastelands and/or farmland including the steps of: (1) installing a plurality of reinforced concrete piles at a height of 1 meter or more on a lattice-divided surface of a ground or a water level of the foreshore in a solar cell panel installation area; (2) constructing a lattice-type truss by connecting a plurality of steel beams in a transverse direction on the reinforced concrete piles and a plurality of rails on the steel beams in a longitudinal direction on the steel beams; (3) installing a solar cell panel by varying inclination of the solar cell panel to cover a complete 360-degree range by adjusting a length of a length-variable connector between the plurality of rails of the lattice-type truss and 4 axes of left, right, upper, and lower sides of the solar cell panel; and (4) constructing a rail for driving a track vehicle between the rails mounted on the transverse steel beams of the lattice-type truss, thereby providing a solution for changing the inclination of the solar cell panel up to 360 degrees without modifying the solar cell panel mounting structure thereby providing a safe structure against typhoons by a lattice-type truss structure in which a load is distributed by a plurality of concrete piles and enhancing durability of a solar cell panel system to near-permanent status by facilitating streamlined replacement and maintenance of the solar cell panel through the use of a track vehicle equipped with necessary tools and mechanisms for efficient panel handling and servicing, wherein construction expenses of a large-scale solar cell power plant are significantly lowered compared to traditional construction methods that require extensive land acquisition and substantial civil engineering efforts for land leveling, cost reduction being achieved by utilizing a lattice-type truss system adjusted by the piles to various heights, which negates a need for extensive terrain modification to create a level installation surface.

In some aspects, the techniques described herein relate to a method, wherein a plurality of solar cell panel frames are connected to upper and lower portions of a solar cell panel frame with rollers under the solar cell panel to pull the solar cell panels between the rails by an electric wrench.

In some aspects, the techniques described herein relate to a method, wherein the length-variable connector is configured as a hydraulically or electrically controlled, and an electronic control device having ID installed for remotely controlling the length adjustment of each selected connector.

In some aspects, the techniques described herein relate to a method, further includes an additional step of configuring a system control center for controlling operation of the plant, the track vehicles, and the length adjustment of selected connector of each panel by a computer of the system control center.

In some aspects, the techniques described herein relate to a method, wherein the track vehicle includes a self-driving electric vehicle equipped with a cleaning tank, a compressor, and sensors for detecting dirt on the panels on the left and right sides of the track for self-cleaning the panels. a computer for controlling vehicle function and a multi-joint robot for built-in panel cleaning by operating in specific sectors by a computer of a system control center.

In some aspects, the techniques described herein relate to a method further includes an additional step of operating a drone (UAV) by a system control center for detecting dirt on the solar cell panels of the solar cell installation area of the plant and delivering detected dates to nearby tracks for cleaning.

In some aspects, the techniques described herein relate to a method, wherein the concrete pile is selectively configured from a reinforced concrete pile, a PHC pile, a monopile, a steel structure pile, and a wooden structure pile.

In some aspects, the techniques described herein relate to a method, wherein the transverse steel beam is configured using a component selected from a steel structure or a reinforced concrete beam, and a longitudinal rail is selectively configured using T-shaped steel, L-shaped steel, H-shaped steel, stainless steel, or two or more beams combined.

In some aspects, the techniques described herein relate to a method, wherein the rails are formed a plurality of perforated holes in the rail or attached other rails having a plurality of perforated holes for bolt fastening, for fastening the length-variable connector to the rail.

In some aspects, the techniques described herein relate to a method, further includes an additional step of constructing a facility selected from a greenhouse, a livestock shed, a warehouse, a factory, a commercial facility, a solar farm management facility, and an ESS under the lattice-type truss by constructing the concrete piles at a height of 3 meters or more in farmland or wasteland.

In some aspects, the techniques described herein relate to a method, wherein the concrete piles are installed at a height of 3 meters or more from the water surface of foreshore, lake and river, and a passage is formed under the lattice-type truss to enable a small boat passing under the lattice-type truss.

In some aspects, the techniques described herein relate to a method, further includes an additional step of constructing a plurality of wind power generation facilities and configured to share an access path, a transmission path, and an ESS system for building a hybrid power generation system for generating electricity even when there is no sunlight or wind.

In some aspects, the techniques described herein relate to a method, further includes an additional step of configuring a reflector selected from a mirrorfilm and a solar cell film on a rear surface of the solar cell panel so as to increase an amount of sunlight irradiation under the lattice-type truss.

In some aspects, the techniques described herein relate to a method, wherein the solar cell panels are including transparent or translucent panels for increasing sunlight irradiation under the lattice-type truss.

In some aspects, the techniques described herein relate to a method, wherein the constructing a truss, includes the step of installing a plurality of reinforced concrete piles on a lattice-divided north-south and east-west equidistant surface of the ground or water level of the foreshore in the solar cell installation area and constructing the lattice-type truss by installing a plurality of steel beams longitudinally in a south-north direction on the concrete piles and a plurality of rails in a transverse direction on the steel beams for installing solar cell panels.

In some aspects, the techniques described herein relate to a method, wherein the installing a solar cell panel includes the step of constructing a group of solar cell panels consisting of a plurality of solar cells panels in a transverse direction by connecting 2 axes of the lower part of the solar cell panel to a south rail of selected two rails and 2 axes of an upper part of the solar cell panel to north rail of the selected two rails by varying the inclination of the solar cell panel by adjusting the length between the 2 axes of the upper part of the solar cell panel and north rail of the selected two rails, and constructing the rail for driving the track vehicle on a shadow area between the group of solar cell panels.

In some aspects, the techniques described herein relate to a method, wherein installation of a solar cell panel further configures 2 axes of the lower part of the solar cell panel to connect to a south rail of the selected two rails, and a center between 2 axes of an upper part of the solar cell panel to connect to a north rail of the selected two rails, connected with a hydraulic or electrical length variable adjuster for adjusting the length by a computer of a system control center.

In some aspects, the techniques described herein relate to a method, further includes an additional step of configuring a monorail or a steel pipeline connected on top and bottom of the group consisting of a plurality of solar cell panels linked in transverse direction along with the rail, and in connection with the steel pipeline or the monorail, configuring a roller brush electrically rotating between the top and bottom of the panels for cleaning dirt on the panels and moving along the monorail or steel pipe line by a computer of a system control center.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

LIST OF REFERENCE NUMERALS

Figure 1:
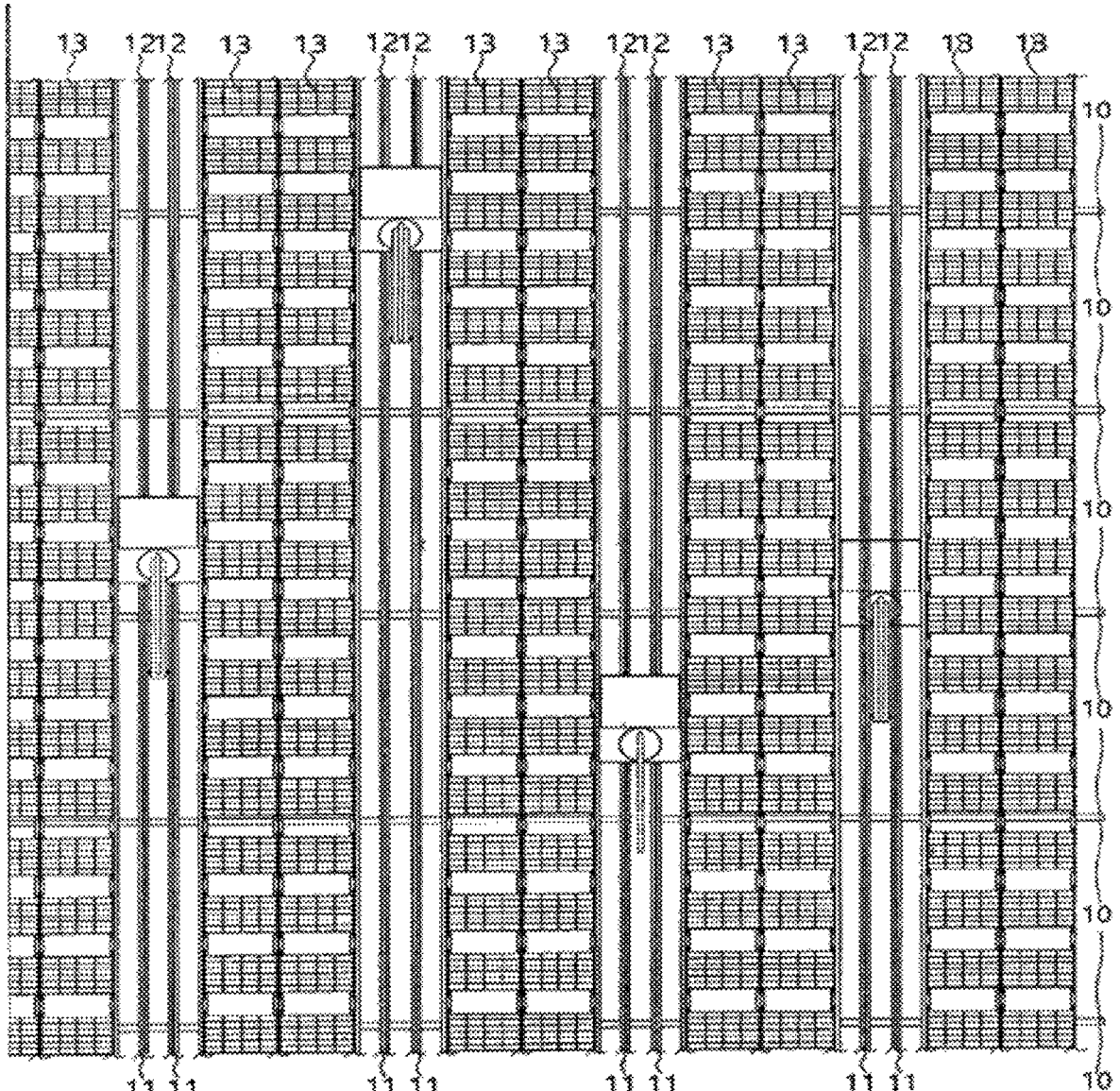
FIG. 1 is a plan view of the system configuration of the present invention.

10: Horizontal cradle.
11: Rail for mounting solar cell panels

12: Rail for operating trackwork vehicles
13: Solar cell panels
14: connector
15: Concrete pile support posts
16: Track Vehicle

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in art to variously employ the present invention.

As used herein, a solar cell panel collectively refers to the photovoltaic power generation array that generates electricity by combining modules, which are the smallest units of solar cells or photovoltaic cells; including the frame for protecting arrays, it is referred to as solar cell panel or a solar panel.

In at least one aspect, specialized methods and system technology are introduced that significantly reduce the costs associated with converting mudflats into solar power plants. This approach ensures that the construction of a solar power generation system on coastal tidal mudflats, elevated at least 1 meter above sea level, preferably 3 meters or more at high tide, does not adversely affect the existing fisheries business.

For a large-scale solar cell panel to be successfully installed on a tidal mudflat, it must possess a structure robust enough to withstand sea winds and typhoons without the risk of sinking or collapsing. It is crucial to develop a solar panel installation system that allows for the adjustment of the panel's inclination at any time after installation. This system should enable the panel to rotate a full 360 degrees, thereby maximizing solar collection efficiency.

Furthermore, when dealing with wastelands, the invention calls for the construction of concrete piles arranged in a lattice pattern, with a minimum height of 1 meter above the highest elevation of the wasteland. This approach eliminates the need for extensive civil engineering projects aimed at flattening the uneven terrain of barren desert wastelands. By establishing a lattice-type truss system supported by multiple longitudinal rails on both the cradle and pedestals set on concrete piles, a typhoon-resistant structure is achieved. This design also addresses the reduction in power generation efficiency caused by geothermal heat in desert-type wastelands and significantly lowers the cost of civil engineering required to create flatlands, as the truss system is adjusted based on the height of the piles.

Additionally, for applications involving farmland, concrete piles are placed in a lattice shape at least 3 meters, preferably 5 m above the farmland, and a lattice-type truss is built on top of which a horizontal steel frame cradle and a plurality of longitudinal rails are connected to provide agricultural solar power generation system that does not harm farming by adjusting the distance between piles and height of cell panels among the rails.

In another aspect, a hybrid power generation system that integrates the advantages of both solar and wind power generation is provided. It achieves this by installing large-scale solar panels on tidal flats, wastelands, or farmlands, and by setting up several wind power facilities that share common infrastructure, such as access paths, transmission lines, and Energy Storage Systems (ESS). The goal of this invention is to offer a method and system for building large-scale, environmentally friendly power plants capable of serving as alternatives to conventional thermal and nuclear power generation methods.

In order to achieve the above purpose, the present invention provides a truss structure that is safe against typhoons by driving piles made of non-corrosive material in tidal mudflats, wasteland or farmland into the ground in a lattice pattern, constructing a transverse iron support on the piles, and constructing a lattice-type truss that connects a number of longitudinal rails and distributing the load on the transverse iron support.

By constructing the height of the truss to be at least 1 m, preferably 3 m or more, from the sea level of the tidal mudflat or the surface of the farmland, and constructing it to be at least 1 m from the high point of the curved surface in the case of wasteland, the present invention provides a system that does not damage tidal flat fishing, farming or wasteland ecosystems.

The present invention is safe even against typhoons by connecting the 4 axes of the solar cell panel between the rails with variable length connector per axis and provides a structure that enhances the solar light collection efficiency by varying the inclination of the panel in the direction of 360 degrees based on the variance of the length of each connector.

The structure on which the solar cell panels are installed consists of rails to provide a structure that is safe against strong winds, and the gap between the panels is arbitrarily variable between the rails to provide a structure that enables concurrent engagement in fishing or farming.

In between the rails, track vehicles 16 are used to transport heavy solar cell panels to railcars equipped with cranes; because the cranes make it easy to install, dismount, replace and troubleshoot solar panels, the lifespan of the system is improved semi-permanently.

Moreover, effective solar power generation facilities are built on vast tidal mudflats, wasteland or farmland, in addition, by additionally building multiple wind power generation facilities, the present invention provides technology for building a hybrid power generation station that mutually complements solar power generation and wind power generation by sharing the access paths, transmission routes and ESS.

Existing solar cell panels had a problem of increasing the cost of power generation due to high land prices when installed on flat land, and there were difficulties of not being able to build large-scale solar power generation facilities in cities due to residents' resistance against panel reflected light waves.

Due to the above problems, in some countries, experiments are continuing with building photovoltaic power generation facilities on the bottom of a salt field or on a road surface, but the problem of high cost exists.

In order to solve the above problems and reduce the cost of solar power generation, the present invention provides a most economical way and system apparatus to build a large-scale solar cell power plant on abandoned tidal mudflats on a beach, wastelands or farmland without harming the unique functions of tidal mudflats, wastelands or farmland therefore greatly reduce the cost for securing land.

The present invention, by configuring a lattice-type truss structure with a transverse iron cradle and a plurality of longitudinal rails at the top of a plurality of concrete piles placed on a lattice-type pattern on tidal flats, wasteland or farmland, provides a structure that does not sink by distributing the load, is not titled, is sturdy, and is safe even against typhoons.

The present invention, by installing the solar cell panels on the rail of the truss, has the effect of greatly reducing system construction costs because there is no need to configure a separate panel mounting structure.

Furthermore, the present invention provides the most economical solution to build a large-scale solar power plant because this system is not necessarily civil engineering work and greatly save the cost of civil engineering work for creating flatlands since the truss is leveled by the height of the pile.

Moreover, the present invention has the effect of improving the lifespan of the solar power plant semi-permanently because the solar cell panels are installed and dismounted using the track vehicle 16, it is easy to install and dismantle the solar panels and it is easy to repair or replace each panel in case of failure.

In addition, the present invention is a hybrid power plant configuration in which the power generation is mutually supplemented even at night or when there is no wind by building wind power generation facilities in addition to photovoltaic power generation facilities on tidal mudflats, wasteland or farmland to share access paths, transmission routes and ESS, and it thus provides eco-friendly power plant construction technology that replaces nuclear power generation and thermal power generation.

Also, because the present invention builds solar cell panels on rails using rails, it has the effect of providing a win-win system whereby the sunlight irradiation rate is increased and thereby obstacles to tidal mudflat fishing and farming are minimized by adjusting the space between rails or with the reflectors attached to the back of the panel.

In particular, the present invention not only does not interfere with the livelihood of fishermen using tidal mudflats but also provides a means to swiftly move at high tide using a railcar built between the rails of this system, thereby providing a win-win system.

Figure 2:
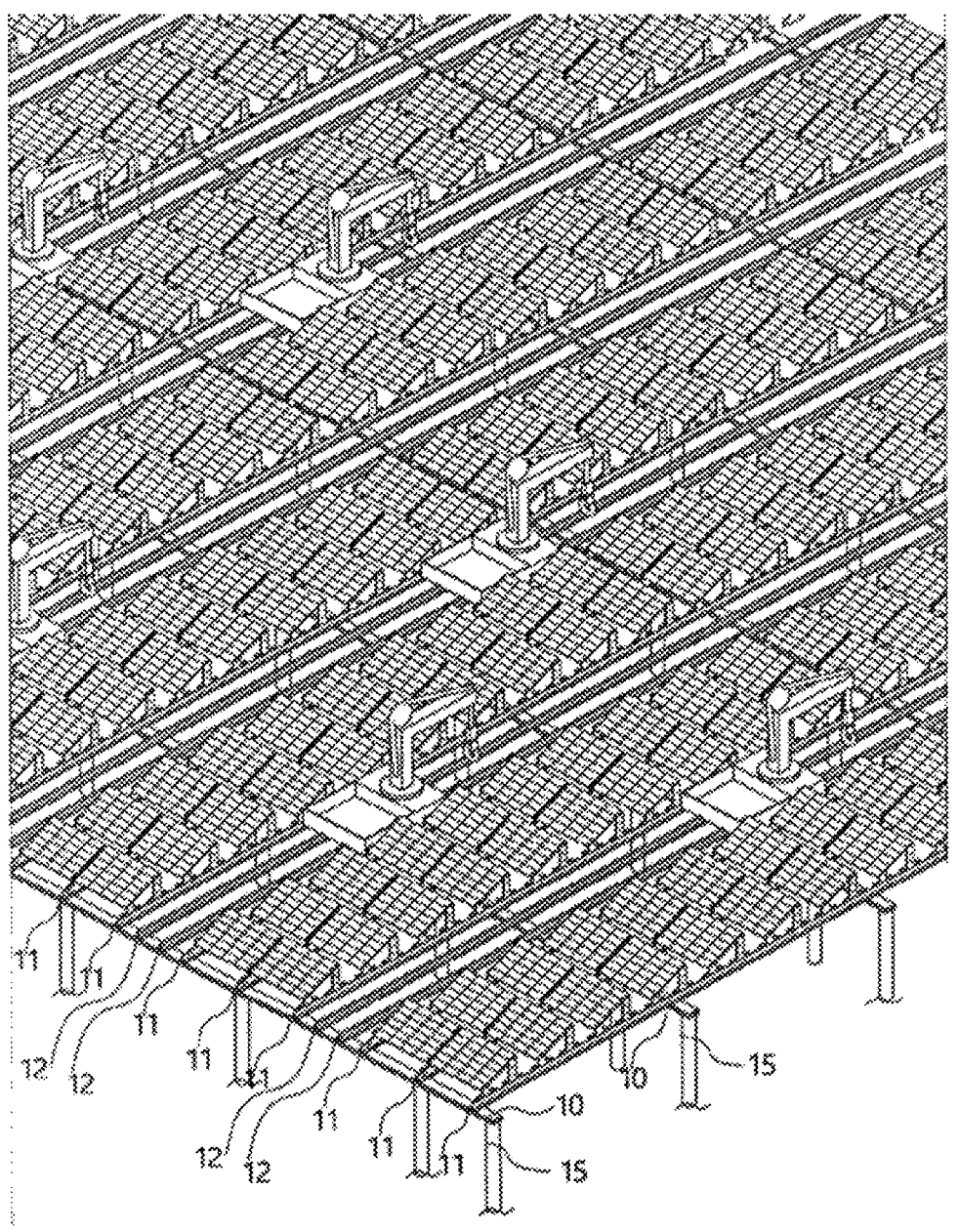
FIG. 2 is a 3D perspective view of the system configuration of the present invention.
Figure 3:
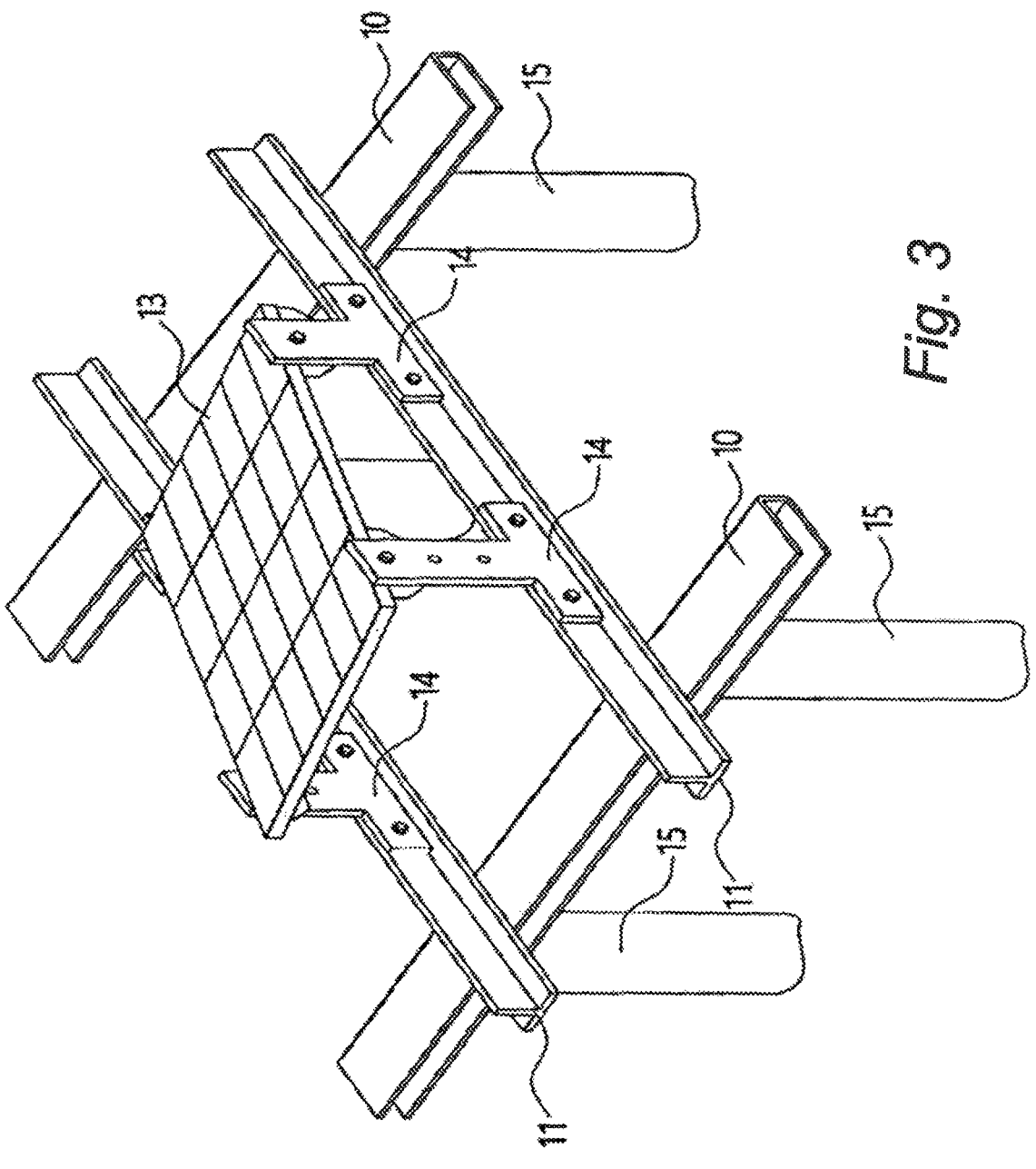
FIG. 3 is a configuration diagram of the system apparatus that converts the inclination of each panel of the present invention.

As shown in FIGS. 1, 2 and 3, the power generation system of the present invention is the configuration that includes a plurality of support posts (15) made of concrete piles that are driven in to a tidal mudflat, wasteland or farmland in a lattice shape with a pile-hammer and fixed at a height of 1 m or more from the sea level or the surface of the wasteland or farmland, preferably 3 m or more; a transverse cradle (10) composed of a plurality of steel frame structures bonded on the plurality of concrete support posts built in the lattice shape as above; a lattice-type truss (FIG. 2) constructed with a transverse support and a longitudinal rail by joining a plurality of rails (13) on the longitudinal direction on the transverse support; a solar cell panel (13) that is configured to adjust the panel's inclination to 360 degrees by connecting the left, right, top and bottom 4 axes of the solar cell panel to the rail between the plurality of rails bonded to and configured on the above truss with length-variable connector (14); and a rail (12) built for operation of a working track vehicle (16) between the rails on which the solar cell panel is mounted; and thereby the present invention provides a safe structure against typhoons by lattice-type structure in which the entire solar cell mounting system does not tilt or sink due to the soil adhesion of the concrete piles driven into and fixed on the ground and a load is distributed by a plurality of concrete piles; provides a solution for adjusting the inclination of the solar cell panel to 360-degrees without deforming the panel mounting structure; improves the lifespan of the plant semi-permanently since it is easy to replace any broken panel, transport, install, dismount, and maintain the solar panels by the track vehicle; provides the most economical solution to build a large-scale solar cell power plant by reducing the cost for securing land, and the cost of civil engineering work for creating flatlands unnecessary since the truss is leveled by the height of the pile; and provides an optimal solution to build an eco-friendly hybrid power generation system that substitutes nuclear or thermal power generation by additionally configuring wind power generator that share access paths, transmission routes and ESS.

As shown in FIGS. 1, 2 and 3, the present invention is comprising a plurality of support posts (15) made of concrete piles that are driven in to a tidal mudflat, wasteland or farmland in a lattice shape with a pile-hammer and fixed at a height of 1 m or more from the sea level or from the surface of the wasteland or farmland, preferably 3 m or more; a transverse cradle (10) composed of a plurality of steel frame structures bonded on the plurality of concrete support posts built in the lattice shape as above; a lattice-type truss (FIG. 2) constructed with a transverse support and a longitudinal rail by joining a plurality of rails (13) on the longitudinal direction on the transverse support; a solar cell panel (13) that is configured to adjust the panel's direction in the direction of 360 degrees by connecting the left, right, top and bottom 4 axes of the solar cell panel to the rail with length-variable connector (14); and a rail (12) built for operation of a working track vehicle between the rails on which the solar cell panel above is mounted; and thereby the present invention provides a safe structure against typhoon in which the entire solar cell mounting system does not tilt or sink due to the soil adhesion of the concrete piles driven into and fixed on the ground and the lattice-type truss structure; provides a solution for the variable setting of the inclination of the solar cell panel to 360-degrees without modifying the panel mounting structure by fixing 4 axes of the panel and rails of the truss; and improves the lifespan of the plant semi-permanently because it is easy to replace broken panel and maintain the system by the track vehicle equipped with a crane for working along the rail, and provides most economical solution to build a large-scale solar power plant by reducing the cost for securing land and the cost of civil engineering work for creating flatlands unnecessary since the truss is leveled by the height of the pile.

In the above configuration, by configuring the variable-length connector to be hydraulic or electric, it can be configured so that the inclination of each panel can be remotely adjusted by a computer program of the control center when additionally configuring the ID and electronic control apparatus.

In addition, by configuring each length-variable connector and the rail joint to be fixed with two or more bolt nuts, the present invention provides a stable structure that does not tilt even in strong winds or typhoons.

Moreover, the system of the present invention is built on a vast area of tidal mudflats and because the area of one tidal mudflat is at least 10 km² (1,000 ha) on average and thus it is impossible to install or maintain on foot, it is desirable to construct a lightweight electric rail car track in conjunction with the rail; if necessary, however, the rails can be replaced with a steel pipe or a perforated steel plate for operating light vehicles using oil or gas.

Moreover, in the case of the concrete piles (posts) that are riven into the tidal mudflat, their soil adhesion increases as they are driven deeper into the ground; to note, it is preferable to drive the piles into and fix them between 10 and 20 meters underground and, if the tidal mudflat or wetland is deep, the posts can be fixed by connecting concrete piles or high-strength PHC piles and driving them into the underground bedrock layer of 50 meters or more.

For the method of fixing the posts consisting of concrete piles by driving them into tidal flats, wasteland or farmland, pile-hammers such as PILE-HAMMAR or PILE-DRIVER are used; since the issue of the height of the posts to be driven into the ground with the pile-hammer from the sea level, wasteland or farmland surface at high tide is determined by the nature of the land or the crops of the farmland, so the height of the post is not limited in the present invention.

In the present invention, the ground height of the concrete piles to be built by driving the piles into the tidal mudflats or farmland is preferably 3-5 meters in order not to interfere with fishing or farming, and in the case of wasteland, a height of at least 1 meter is desirable so as not to damage the ecosystem by leaving the bend of the wasteland intact; however, the specific height should be determined to be suitable for the local site by examining the form and characteristics of the site.

In the case of the truss to be built on wasteland, farmland or tidal flat, the system of the present invention can be constructed by dividing the area of the truss into a plurality, as necessary.

Figure 4:
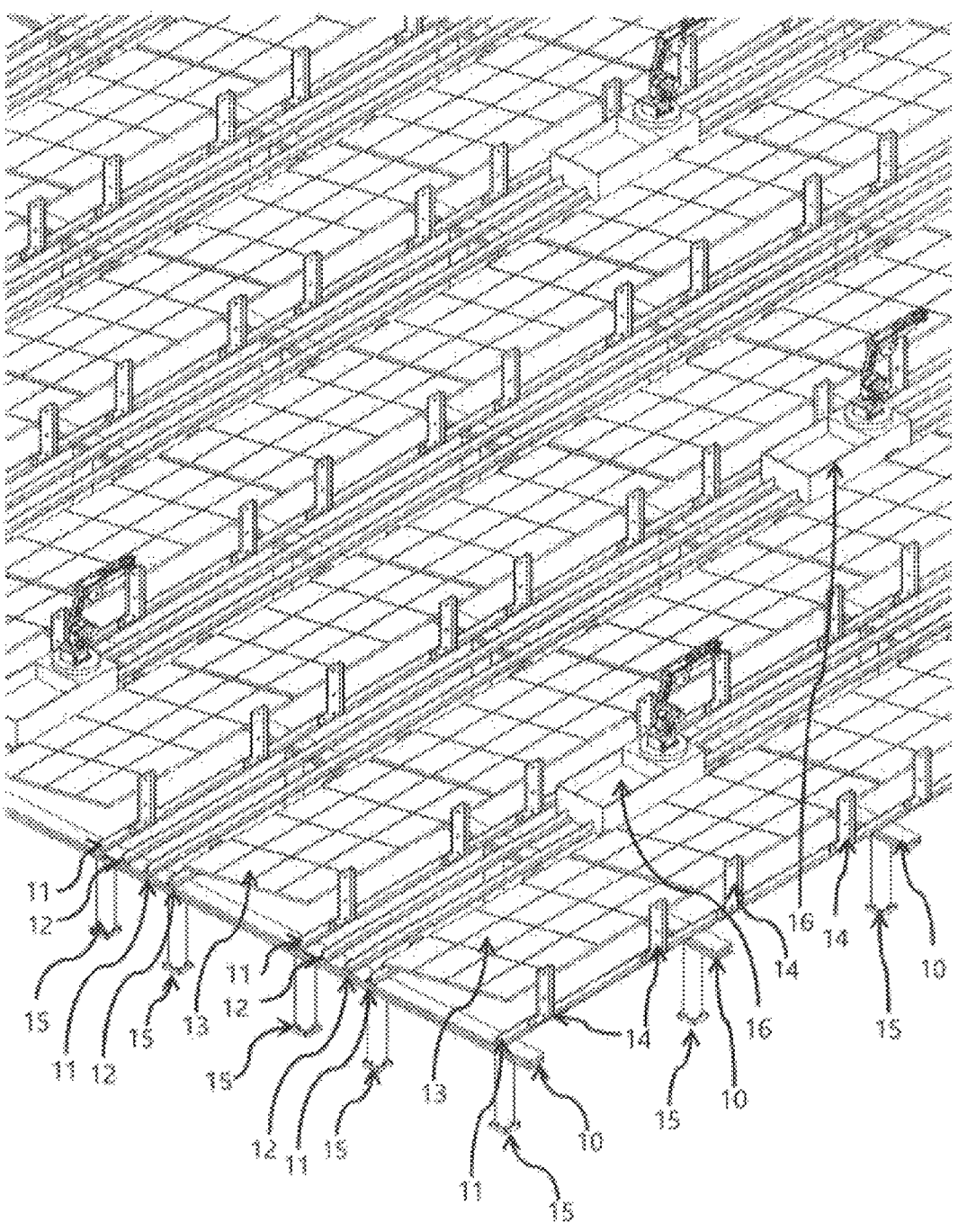
FIG. 4 is a configuration diagram of the practical application of the system apparatus of the present invention.

Also, as shown FIG. 4, the truss can be configured to install a plurality of reinforced concrete piles on a lattice-divided north-south and east-west equidistant surface of the ground or a water level of the tidal mudflat and constructing a lattice-type truss by connecting a plurality of steel beams longitudinally in the south-north direction on the concrete piles and a plurality of rails in transverse direction on the steel beams for installing a solar cell panels, and constructing a group of solar cells panels in transverse direction by connecting 2 axes of lower part of the solar cell panel to the south rail of selected two rails and 2 axes of upper part of the solar cell panel to north rail of the two rails by varying the slop of the solar cell panel by adjusting the length between the 2 axes of the upper part panel and the rail; and constructing the rail for driving the track vehicle on the shadow area between the group of solar cell panels; thereby the angle of the panels can be adjusted by 2 axes of upper part of the solar cell panel to north rail of the two rails configuring a hydraulic or electrical length variable adjuster (e.g., a hydraulic or electrical length variable means) between the 2 axes and the rail for adjusting the length by a computer of the system control station.

In the above system, the solar cell panel further can be configured 2 axes of the lower part of the solar cell panel connected to the south rail of the selected two rails, and the center between 2 axes of the upper part of the solar cell panel connect to a north rail of the two rails with a hydraulic or electrical length variable means for adjusting the length by a computer of the system control center.

Further, the system configures additionally a monorail or a steel pipeline connected to the top and bottom of the group consisting of a plurality of solar cell panels linked in a transverse direction along with the rail, and in connection with the steel pipeline or the monorail, configuring a roller brush electrically rotating between the top and bottom of the panels for cleaning dirt and moving along with the monorail or a steel pipeline by a computer program of the system control center.

In the present invention, by configuring a plurality of high-strength PHC piles or concrete piles that are not easily corroded by seawater in a lattice shape at a depth of 10-20 meters below the tidal flat, and a steel lattice truss is fixed on the top thereof, the configuration prevents the truss from tilting or sinking based on the lateral adhesion and frictional force of the soil and the structural control of the steel truss bound to the top, in addition to preventing partial sinking of the concrete support posts because the gravity applied to the truss is evenly distributed, thereby providing a safe structure even when building heavy equipment on the trust.

The above theory is the same as the theory that the world's tallest building built on sand in the UAE does not collapse, and the above theory is confirmed by the fact that the Leaning Tower of Pisa in Italy became a leaning tower because there is no pile configured underground.

In the present invention, the horizontal cradle mounted on the concrete post (pile) consists of a plurality of rails and a steel structure or reinforced concrete beams designed to support the weight of solar cell panels; the rails for mounting solar cell panels can be configured by selecting from T-beams, L-beams, H-beams, □-beams, and U-beams, or by connecting two or more of the said rails.

In addition, in the present invention, the reason behind configuring the piles to be driven into and fixed on the ground as concrete piles is due to the concrete pile support post's characteristic of not being corroded by the salt of seawater; the pile can be configured by waterproofing high-strength PHC pile, steel pile, mono pile, or hardwood; the concrete blocks can be buried underground to fix the piles according to the condition of the stratum in wasteland or farmland.

In addition, when it is intended to build a super-scale wind power generation facility in a tidal flat or wetland, the present invention can be configured with a mono pile instead of a concrete pile.

The method of constructing the system of the present invention is not affected by high tide and low tide; even in the case of constructing the solar power generation facility of the present invention on a soft tidal flat, it neither tilts nor sinks, and a structural configuration that is safe from typhoons is essential.

To achieve the above goal, the method of constructing the solar cell power plant of the present invention comprising the step for placing a plurality of concrete posts (15) in a lattice pattern on the area where the solar cell panel is to be installed in tidal mudflats, wasteland or farmland, thereby driving and fixing a pile (post) with a pile-hammer at a height of at least 1 meter or more from the sea level of the tidal flat or the surface of the farmland; the step for constructing by bonding a horizontal cradle (10) made of a steel frame structure or a reinforced concrete structure on the plurality of concrete support posts; the step of constructing a lattice-type truss consisting of a horizontal support and a vertical rail by connecting a plurality of rails in the longitudinal direction on the horizontal support (FIGS. 1 and 2); the step for installing the length-variable connector (14) to connect the plurality of rails bonded to the lattice-type truss and the four axes of the upper, lower, left, and right sides of the solar cell panel, and then constructing a solar cell panel by varying the solar cell panel's inclination to 360 degrees by adjusting the length of the connector; the step for building the rail (12) on a horizontal cradle for operating a working track vehicle between the rails on which the solar cell panel is mounted, and the step for installing a system control center with a host computer for operating the plant, the track vehicles, a drone (UAV) for detecting dirt on the panel and the length connector; thereby the present invention achieves the goal of semi-permanently improving the lifespan of a solar power generation plant because it's easy to replace broken panels by the track vehicle equipped with a crane that operates along the rail and the entire solar cell mounting system neither tilts nor sinks by the lattice-type truss structure connected on a plurality of lattice-type concrete piles; provides a solution for variable setting of the inclination of the solar cell panel to 360-degrees without modifying the panel mounting structure; provides the most economical solution to build a large-scale solar cell power plant by reducing the cost for securing land, and the cost of civil engineering work for creating flatlands unnecessary since the truss is leveled by the height of the pile; and provides an optimal solution to build an eco-friendly hybrid power generation system that substitutes nuclear or thermal power generation by additionally configuring wind power generator that share access paths, transmission routes and ESS.

In the above configuration, the installation and dismantling of the panels can be simplified and eased by the additional configuration that connects the upper and lower parts of the multiple solar cell panel frames with rollers under the panel, pulling them between the rails with electric wrenches and attaching them to the rails or pulling them down in order to dismantle them.

Moreover, by configuring stairs to access tidal flats, farmland or wastelands per specific section where the railcar travels provide a useful means for quick access by railcar.

In addition, the present invention is further configuring a system control center for controlling operation of the plant, the track vehicles and the length adjustment of selected connector of each panel by a computer of the system control center.

Further, the system control center additionally configures a drone (UAV) to detect dirt on the solar cell panels in the plant's solar cell installation area. The detected dirt is delivered to nearby track vehicles for cleaning.

Also, it is possible to support the livelihood of tidal mudflat fishermen by installing concrete piles at the height of 3 meters or more from the water surface of the tidal mudflat, lake, or river, and a passage is formed under the truss to enable a small boat passing under the truss.

Moreover, land use efficiency can be improved by building a greenhouse, a vinyl house, a warehouse, a factory or barn under the lattice-type truss built in farmland; in necessary cases, if a lattice-type truss is built at a height of 5 meters or more above the ground with concrete piles or steel frame piles built in the wasteland, a warehouse, a factory, a vinyl house, a commercial facilities, a barn or facility supporting the system of the present invention can be built and utilized under the truss.

In addition, the present invention provides useful technology to reinforce the sunlight to the farmland, or build a greenhouse or a vinyl house under the truss by configuring a reflector selected from a mirrorfilm and a solar cell film on the rear surface of the solar cell panel or composing the transparent or translucent panels.

In addition, the rail vehicle can be configured a self-driving electric vehicle equipped a cleaning tank, a compressor, sensors for detecting dirt on the panels on left and right side of the track and self-cleaning the panels, a computer for controlling the function of the vehicle and a multi-joint robot for built-in panel cleaning by operating in specific sectors according to a program of the computer.

In another aspect, a remote controller for adjusting the inclination angle of the panel can be additionally configured by a hydraulic or electric connector (e.g., a connection means) with ID and to be controlled by a computer program of the system control center, so as it's possible connecting two axes of the four sides of the panel to the rail with bolts and nuts and the remining two axes between the rails by configuring a hydraulic or electric connector and seasonally controlling angle of the panel to increase the amount of sunlight irradiated to the farmland by a computer of the system control center.

Furthermore, large-scale eco-friendly power plants that can replace thermal power plants or nuclear power plants can be constructed with a hybrid power generation system that mutually complements solar cell panel power generation and wind power generation by configuring to share the access paths, transmission route and ESS system based on the additional configuration of a plurality of wind power generation facilities in association with vast tidal flats, wasteland or farmland.

As described above, the present invention cannot be applied in a variety of ways, produces power at the scale of a thermal power plant or nuclear power plant by utilizing neglected tidal mudflats, wetlands, wasteland or farmland, provides a system that is easy to install and dismantle for each solar cell panel while changing the inclination of the panel and arbitrarily varying the inclination in the 360-degree direction, and provides a method and system technology that can build a super-scale eco-friendly power plant that can replace nuclear power plants or thermal power plants in the future by improving the lifespan of the solar power generation system semi-permanently thanks to its easiness in maintaining and replacing each solar panel.

Accordingly, because the present invention can be used in various other forms without departing from the technical spirit or main characteristics of the present invention, all modifications and amendments that fall within the scope of equivalents of the claims of the present invention belong to the scope of the present invention.

The present invention enables building an economic complex of solar and wind power generation facility that can replace a nuclear power plant without damaging tidal flats, wasteland or farmland; hence, the present invention enables constructing a hybrid power generation system that mutually complements even if there is no sunlight or no wind, thereby allowing it to be used in the construction industry of eco-friendly power plants that can replace nuclear or thermal power plants in the future.

Because the present invention's system can be installed on a river, reservoir or lake, it provides a technology that can be utilized in diverse ways in the eco-friendly power generation industry.

Also, in the present invention, the technology of constructing a solar cell panel using the rails and varying the inclination of the panel to 360 degrees to improve the solar light collection efficiency without modifying the panel mounting structure can be utilized as an effective solution to build a solar power generation system on the rooftop of a factory, shopping mall or a parking lot, and the mountainside slope.

While exemplary embodiments are described above, it is not intended that these embodiments describe all possible forms of the invention. Rather, the words used in the specification are words of description rather than limitation, and it is understood that the various changes may be made without departing from the sprit and scope of the invention. Additionally, the features of various implementing embodiments may be combined to form further embodiments of the invention.

What is claimed is:

1. A method for constructing a solar cell power plant an on area selected from a foreshore, a wasteland, and a farmland, wherein the foreshore comprises tidal flats, comprising the steps of:
   (1) installing a plurality of reinforced concrete piles at a height of 1 meter or more above a ground surface or a water level of the selected area, wherein the reinforced concrete piles are arranged in a lattice pattern in a solar cell panel installation area of the solar cell power plant;
   (2) constructing a lattice-type truss structure by connecting a plurality of steel beams in a transverse direction on the reinforced concrete piles and a plurality of rails on the steel beams in a longitudinal direction on the steel beams;
   (3) installing a solar cell panel on a selected pair of rails from the plurality of rails by varying inclination of the solar cell panel by adjusting a length of a length-variable connector between the selected pair of rails of the lattice-type truss structure and 4 axes of left, right, upper, and lower sides of the solar cell panel; and
   (4) constructing a track for driving a track vehicle running on two adjacent rails of the plurality of rails that are located next to the selected pair of rails on which the solar cell panel is installed for sensing and removing dirt from the solar cell panel positioned on a left side and a right side of the track vehicle, wherein the length-variable connector is configured to change the inclination of the solar cell panel without modifying a solar cell panel mounting structure, thereby providing the lattice-type truss structure configured to resist typhoon-induced wind forces by distributing loads among the plurality of reinforced concrete piles and increasing operational lifespan of the solar cell power plant by facilitating replacement and maintenance of the solar cell panels using the track vehicle; and reducing construction costs of the solar cell power plant by eliminating requirements for extensive land acquisition and civil engineering work for land leveling, since the lattice-type truss structure is leveled by the height of the reinforced concrete piles.

2. The method of claim 1, wherein installing the solar cell panel comprises connecting upper and lower portions of a plurality of solar cell panel frames with rollers positioned under the solar cell panel, and pulling the solar cell panel frames between the selected pair of rails using an electric wrench.

3. The method of claim 1, wherein the length-variable connector is hydraulically or electrically controlled with an electronic control device having an identification (ID) installed for remotely controlling the length adjustment of each selected length-variable connector.

4. The method of claim 1, further comprises an additional step of configuring a system control center for controlling operation of the solar cell power plant, running of track vehicles, and the length adjustment of selected connector of each panel by a computer of the system control center.

5. The method of claim 1, wherein the track vehicle comprises a self-driving electric vehicle equipped with a cleaning tank, a compressor, and sensors for detecting dirt on solar cell panels on left and right sides of a track for self-cleaning the solar cell panels and a computer for controlling vehicle function and panel cleaning by operating in specific sectors according to a program of the computer.

6. The method of claim 1 further comprises an additional step of detecting dirt on solar cell panels of a solar cell installation area of the solar cell power plant and transmitting detected data to nearby tracks for cleaning.

7. The method of claim 1, wherein each reinforced concrete pile of the plurality of reinforced concrete piles is selectively configured from a reinforced concrete pile, a prestressed spun high strength concrete pile (PHC pile), a monopile, a steel structure pile, and a wooden structure pile.

8. The method of claim 1, wherein one or more of the plurality of transverse steel beams is configured using a steel beam, a steel truss structure or a reinforced steel concrete beam, and one or more of the plurality of rails are selectively configured using T-shaped steel, L-shaped steel, H-shaped steel, stainless steel, or two or more beams combined.

9. The method of claim 1, wherein each rail of the plurality of rails on the lattice-type truss structure is either formed with a plurality of perforated holes or joined with auxiliary rails having a plurality of perforated holes, for bolt fastening of the length-variable connector to a rail of the rails.

10. The method of claim 1, wherein when the selected area is the farmland or the wasteland, the method further comprises constructing a facility selected from a greenhouse, a livestock shed, a warehouse, a factory, a commercial facility, a solar farm management facility, and an Energy Storage System (ESS) under the lattice-type truss structure by constructing the reinforced concrete piles at a height of 3 meters or more above the ground surface.

11. The method of claim 1, wherein when the selected area is the foreshore, the reinforced concrete piles are installed at a height of 3 meters or more from a water surface of the foreshore, and a passage is formed under the lattice-type truss structure to enable a small boat passing under the lattice-type truss structure.

12. The method of claim 1, further comprises an additional step of constructing a plurality of wind turbines and configured to share an access path, a transmission path, and an Energy Storage System (ESS) with the solar cell power plant thereby forming a hybrid power generation system for generating electricity even when there is no sunlight or wind.

13. The method of claim 1, further comprises an additional step of configuring a reflector selected from a mirrorfilm and a solar cell film on a rear surface of the solar cell panel so as to increase an amount of sunlight irradiation under the lattice-type truss structure.

14. The method of claim 1, wherein solar cell panels comprise transparent or translucent panels for increasing sunlight irradiation under the lattice-type truss structure.

15. The method of claim 1, wherein constructing the lattice-type truss structure comprises the step of installing the plurality of reinforced concrete piles on a lattice-divided north-south and east-west equidistant surface of the ground surface or water level of the selected area in the solar cell panel installation area and constructing the lattice-type truss structure by installing the plurality of steel beams in a transverse direction between south and north direction on the reinforced concrete piles and the plurality of rails in a longitudinal direction on the steel beams for installing solar cell panels.

16. The method of claim 15, wherein installing the solar cell panel comprises the step of constructing a group of solar cell panels consisting of a plurality of solar cell panels in a transverse direction by connecting 2 axes of a lower part of the solar cell panel to a south rail of the selected pair of rails and 2 axes of an upper part of the solar cell panel to a north rail of the selected pair of rails by varying the inclination of the solar cell panel by adjusting the length between the 2 axes of the upper part of the solar cell panel and the north rail of the selected pair of rails, and constructing a track for driving the track vehicle on a shadow area between the group of solar cell panels.

17. The method of claim 15, wherein installation of the solar cell panel further configures 2 axes of a lower part of a solar cell panel frame to connect to a south rail of the selected pair of rails, and a center between 2 axes of an upper part of the solar cell panel frame to connect to a center of a north rail of the selected pair of rails, connected with a hydraulic or electrical length variable adjuster for adjusting the length by a computer of a system control center.

18. The method of claim 15, further comprises an additional step of configuring a monorail or a steel pipeline connected on top and bottom of a group consisting of a plurality of solar cell panels linked in transverse direction along with the plurality of rails, and in connection with the steel pipeline or the monorail, configuring a roller brush electrically rotating between a top and bottom of the solar cell panels for cleaning dirt on the solar cell panels and moving along the monorail or steel pipe line by a computer of a system control center.

19. A method for constructing a solar cell power plant on an area selected from a foreshore, a wasteland, and a farmland, wherein the foreshore comprises tidal flats, the method comprising the steps of:

(1) installing a plurality of reinforced concrete piles at a height of 1 meter or more above a ground surface or a water level of the selected area, wherein the reinforced concrete piles are arranged in a lattice pattern in a solar cell panel installation area of the solar cell power plant;

(2) constructing a lattice-type truss structure by connecting a plurality of steel beams in a transverse direction on the reinforced concrete piles and a plurality of rails on the steel beams in a longitudinal direction on the steel beams;

(3) installing a solar cell panel on a selected pair of rails from the plurality of rails by varying inclination of the solar cell panel by adjusting a length of a length-variable connector between the selected pair of rails of the lattice-type truss structure and 4 axes of left, right, upper, and lower sides of the solar cell panel; and (4) constructing a track for driving a track vehicle running on two adjacent rails of the plurality of rails that are located next to the selected pair of rails on which the solar cell panel is installed for sensing and removing dirt from the solar cell panel positioned on a left side and a right side of the track vehicle, wherein the length-variable connector is configured to change the inclination of the solar cell panel without modifying a solar cell panel mounting structure.

* * * * *